United States Patent [19]

Yanagimoto

[11] Patent Number: 5,963,946
[45] Date of Patent: Oct. 5, 1999

[54] INFORMATION RETRIEVAL SYSTEM FOR PRESENTING INFORMATION OBTAINED THROUGH EFFICIENT RETRIEVAL OF A DATA BASE AND PROCESSING OF THE RETRIEVAL RESULTS

[75] Inventor: Hidekazu Yanagimoto, Tokyo, Japan

[73] Assignee: NEC Corporation, Tokyo, Japan

[21] Appl. No.: 08/965,526

[22] Filed: Nov. 6, 1997

[30] Foreign Application Priority Data

Nov. 11, 1996 [JP] Japan ..................................... 8-298921

[51] Int. Cl.⁶ .................................................. G06F 17/30
[52] U.S. Cl. .................................. 707/10; 707/2; 707/5; 707/104
[58] Field of Search ............................. 707/2, 5, 10, 104

[56] References Cited

U.S. PATENT DOCUMENTS

| | | | |
|---|---|---|---|
| 5,515,531 | 5/1996 | Fujiwara et al. ............................. | 707/2 |
| 5,600,831 | 2/1997 | Levy et al. .................................... | 707/2 |
| 5,640,553 | 6/1997 | Schultz ........................................ | 707/5 |
| 5,659,742 | 8/1997 | Beattie et al. ........................... | 707/104 |
| 5,717,914 | 2/1998 | Husick et al. ............................... | 707/5 |
| 5,737,734 | 4/1998 | Schultz ........................................ | 707/5 |
| 5,754,841 | 5/1998 | Carino, Jr. ................................... | 707/3 |
| 5,802,511 | 9/1998 | Kouchi et al. ............................... | 707/2 |

FOREIGN PATENT DOCUMENTS

| | | |
|---|---|---|
| 61-267826 | 11/1986 | Japan . |
| 2-87274 | 3/1990 | Japan . |
| 4-169972 | 6/1992 | Japan . |
| 4-279972 | 10/1992 | Japan . |
| 6-282482 | 10/1994 | Japan . |
| 7-28836 | 1/1995 | Japan . |
| 7-49880 | 2/1995 | Japan . |
| 7-56932 | 3/1995 | Japan . |
| 7-295994 | 11/1995 | Japan . |
| 7-319905 | 12/1995 | Japan . |
| 8-286960 | 11/1996 | Japan . |

*Primary Examiner*—Wayne Amsbury
*Assistant Examiner*—Shahid Alam
*Attorney, Agent, or Firm*—Foley & Lardner

[57] ABSTRACT

An information retrieval system for presenting information by processing retrieval results obtained through data retrieval by access to data bases dispersed on a network, comprises a retrieval executing section to, upon receipt of an access request from a user, retrieve data from the data base after specifying a data base as a retrieved party and, in case of specifying a plurality of data bases as the retrieved party, retrieve data in parallel from the plurality of data bases, a retrieval result processing section to process retrieval results obtained through retrieval processing by the retrieval executing section and convert the same in a standard format, and a retrieval result supplying section to supply the retrieval results processed by the retrieval result processing section to a display.

9 Claims, 10 Drawing Sheets

| DATA BASE NAME | PROTOCOL | KANJI CODE | OPERATION HOUR |
|---|---|---|---|
| A UNIVERSITY | http | EUC | 24 HOURS |
| B UNIVERSITY | telnet | SJIS | FROM 8:00 TO 20:00 |

| 1 TITLE / AUTHOR / PUBLISHER / PUBLISHED YEAR / ISBN / ··· 2 TITLE / AUTHOR / ·· |
|---|
| .................................................................................................... |

(B)

1  TITLE / AUTHOR / PUBLISHER / PUBLISHED YEAR / ISBN / ······

2  TITLE / AUTHOR / PUBLISHER / PUBLISHED YEAR / ISBN / ······

3  TITLE / AUTHOR / PUBLISHER / PUBLISHED YEAR / ISBN / ······

| a | AUTHOR: TITLE: PUBLISHER / PUBLISHED YEAR: ISBN: ⋯ B AUTHOR: TITLE ⋯ |

(B)

a   AUTHOR: TITLE: PUBLISHER: PUBLISHED YEAR: ISBN: ⋯⋯ b   AUTHOR: TITLE: PUBLISHER: PUBLISHED YEAR: ISBN: ⋯⋯ c   AUTHOR: TITLE: PUBLISHER: PUBLISHED YEAR: ISBN: ⋯⋯

(A)
- DISPLAY THE RETRIEVAL RESULTS — 801a
- NUMBER — 802a
- TO THE SIXTH ITEM OF··· — 803a
- NO MORE RETRIEVAL RESULTS ARE THERE. — 804a (B)
- Search Result — 801b
- ALPHABET — 802b
- TO THE EIGHTH ITEM OF··· — 803b
- End — 804b

INFORMATION RETRIEVAL SYSTEM FOR PRESENTING INFORMATION OBTAINED THROUGH EFFICIENT RETRIEVAL OF A DATA BASE AND PROCESSING OF THE RETRIEVAL RESULTS

BACKGROUND OF THE INVENTION

1. Field of the Invention

The present invention relates to an information retrieval system for retrieving information from a data base. More particularly it relates to an information retrieval system improved in efficiency by shortening the waiting time at retrieval and one capable of presenting information, if necessary, by processing the retrieval results of various formats obtained through retrieval so that they may be evaluated easily.

2. Description of the Related Art

Various kinds of inventions have been proposed with respect to the information retrieval technique for obtaining desired data by access to data bases dispersed on a network. A conventional technique of this kind is disclosed in, for example, Japanese Patent Publication Laid-Open (Kokai) No. Heisei 2-87274, "On-Line Information Retrieval System". The same publication discloses a system for obtaining desired data from a data base on a network, which comprises a communication means for gaining access to a data base on a network, an input means of a retrieval expression, a conversion means for converting the format of the received retrieval expression into one for use in a data base to be retrieved, and a means for storing and editing the data results retrieved by the use of the converted retrieval expression.

Another conventional technique of this kind is disclosed in, for example, Japanese Patent Publication Laid-Open (Kokai) No. Heisei 7-56932, "Information Retrieval System". The same publication discloses a system for obtaining desired data from a data base on a network, which comprises a for receiving a retrieval request for analyzing it, a for converting the format of the analyzed retrieval request into that one for use in a data base to be retrieved, a means for selecting a proper data base depending on the content of the retrieval request, and a means receiving retrieval results from the selected data base for evaluating them.

Further, various means to improve retrieval speed have been proposed in the conventional information retrieval techniques. A conventional technique of this kind is disclosed in, for example, Japanese Patent Publication Laid-Open (Kokai) No. Heisei 7-28836, "Data Base Retrieval Method and a Data Base System Using This Method". The same publication discloses a system for sharing the retrieval processing corresponding to a retrieval request among a plurality of retrieval server tasks so as to execute the retrieval processing in parallel, the system comprising a plurality of external storage operable in parallel and a plurality of retrieval server tasks for retrieving data individually from each external storage. In this way, many of the conventional techniques of this kind aim to improve the speed of the retrieval processing itself.

Further, swift and accurate evaluation of retrieval results is an important matter in the conventional information retrieval technique. Various techniques for reducing user's labor by devising the output format of retrieval results have been proposed. A conventional technique of this kind is discloses in, for example, Japanese Patent Publication Laid-Open (Kokai) No. Heisei 7-319905, "Information Retrieval System". The same publication discloses a system for supporting the operation of a user's focussing on desired data among the retrieval results, after data retrieval, a means for sorting retrieval results based on a predetermined viewpoint, a means for displaying the sort results simultaneously, and a means for displaying the details of some sort results selected from the displayed sort results.

The above-mentioned conventional information retrieval techniques, however, are insufficient to improve the retrieval speed and support the evaluation work of retrieval results.

When considering the access to a data base dispersed on a network, in order to improve the retrieval speed, it is necessary to do the retrieval processing in consideration of the difference in the response time per each data base and the difference in the burden of the network. However, these considerations are taken in none of the above mentioned conventional techniques. Even if the above-mentioned conventional system is used in gaining access to a plurality of data bases dispersed on a network, there is no use expecting substantial reduction in the retrieval time, with necessity of further improvement remaining there.

Since the system disclosed in the patent publication No. 2-87274 sequentially gains access to all the data bases, it can't make up for delays in the response time in the data bases.

In the system disclosed in the patent publication No. 7-56932, though data bases accessible depending on the content of a retrieval request are restricted, no consideration is taken in case of an extremely poor response occurring in some data base of the selected data bases to be retrieved. Therefore, it is insufficient to improve the retrieval speed and the waiting time.

The system disclosed in the patent publication No. 7-28836 can shorten the time required for retrieval processing itself. However, when retrieving a plurality of data bases, the system can't display the retrieval results until the retrieval result from the last data base is received, because the system displays the retrieval results sorted and integrated. In case of a poor response in a retrieving data base, the system is provided with no means for interrupting the retrieval processing. Therefore, a user must wait until the retrieval in a data base of the poorest response has been completed.

While, in case of access to a plurality of data bases, it is necessary to eliminate redundancy in retrieval results and standardize the display format of the retrieval results, in order to do efficient evaluation work of the retrieval results. The system disclosed in the patent publication No. 7-319905, however, has no consideration as for the overlapping retrieval results and it can't eliminate redundancy caused by the overlap of the retrieval results.

The system disclosed in the patent publication No. 2-87274 has no consideration for the difference in display format when searching for overlapping data, although it is provided with a function to eliminate the overlapping data. When judging whether it is the same retrieval result or not, the difference in the display formats of the retrieval results affects the judgement. Further, error compensation for searched overlapping data is not considered in the system.

The system disclosed in the patent publication No. 7-56932 can search for overlapping data by comparison among the obtained retrieval results. However, since it only makes a comparison among a plurality of retrieval results, it is difficult to recognize whether it is the same information as for the retrieval result obtained in a different display format.

SUMMARY OF THE INVENTION

An object of the present invention is to provide an information retrieval system capable of improving retrieval speed by dealing effectively with the difference in response time per each data base and the difference in burden of a network in case of access to data bases dispersed over the network, so as to perform efficient retrieval processing.

Another object of the present invention is to provide an information retrieval system capable of making a user's evaluation work easy, by processing retrieval results obtained from a plurality of data bases so that they may be shown on a display in a common format.

According to one aspect of the invention, an information retrieval system for presenting information by processing retrieval results obtained through data retrieval by access to data bases dispersed on a network, comprises a retrieval executing means for, upon receipt of an access request from a user, retrieving data from the data base after specifying a data base as a retrieved party and, in case of specifying a plurality of data bases as the retrieved party, retrieving data in parallel from the plurality of data bases, a retrieval result processing means for processing retrieval results obtained through retrieval processing by the retrieval executing means and converting the same in a standard format, and a retrieval result supplying means for supplying the retrieval results processed by the retrieval result processing means to a display.

In the preferred construction, the retrieval executing means includes a retrieval monitoring means for monitoring executing condition of retrieval processing for the data base of the retrieved party, and the retrieval result processing means includes a retrieval termination display control means for supplying the retrieval results of the data base having completed the retrieval processing to the display according to the monitoring results by the retrieval monitoring means.

In the preferred embodiment, the retrieval executing means includes a retrieval monitoring means for monitoring executing condition of retrieval processing for the data base of the retrieved party, and the retrieval result processing means includes a retrieval termination display control means for supplying the retrieval results of the data base having completed the retrieval processing to the display according to the monitoring results by the retrieval monitoring means, the retrieval monitoring means, if detecting abnormally terminated retrieval processing, notifying it to the retrieval termination display control means, the retrieval termination display control means supplying a message indicating the occurrence of the abnormal termination to the display upon receipt of the notice of detecting the abnormally terminated retrieval processing from the retrieval monitoring means.

In the preferred embodiment, the retrieval executing means includes a retrieval monitoring means for monitoring executing condition of retrieval processing for the data base of the retrieved party, and the retrieval result processing means includes a retrieval termination display control means for supplying the retrieval results of the data base having completed the retrieval processing to the display according to the monitoring results by the retrieval monitoring means, the retrieval monitoring means measuring running time of retrieval processing in the respective data bases, breaking the retrieval processing if the measured time is beyond a predetermined time limit, and notifying it to the retrieval termination display control means, the retrieval termination display control means supplying a message indicating the occurrence of the abnormal termination to the display, upon receipt of the notice, from the retrieval monitoring means, informing that the processing has been broken because the running time of the retrieval processing was beyond the time limit.

In another preferred embodiment, the retrieval executing means includes a retrieval monitoring means for monitoring executing condition of retrieval processing for the data base of the retrieved party, and the retrieval result processing means includes a retrieval termination display control means for supplying the retrieval results of the data base having completed the retrieval processing to the display according to the monitoring results by the retrieval monitoring means, the retrieval monitoring means, if detecting abnormally terminated retrieval processing, notifying it to the retrieval termination display control means, measuring running time of retrieval processing in the respective data bases, breaking the retrieval processing if the measured time is beyond a predetermined time limit, and notifying it to the retrieval termination display control means, the retrieval termination display control means supplying a message indicating the occurrence of the abnormal termination to the display upon receipt of the notice of detecting the abnormally terminated retrieval processing from the retrieval monitoring means, and supplying a message indicating the occurrence of the abnormal termination to the display, upon receipt of the notice, from the retrieval monitoring means, informing that the processing has been broken because the running time of the retrieval processing was beyond the time limit.

In another preferred embodiment, the retrieval result processing means includes a standard structure extracting means for taking data corresponding to predetermined items out of the retrieval results obtained through retrieval processing by the retrieval executing means, and the retrieval result supplying means includes a redundant data detecting means for detecting the data having the identical content as for all the items by comparison among the respective items of the data taken by the standard structure extracting means, and a merge screen forming means for forming a display screen to be supplied to the display after unifying the identical data and eliminating the redundant data, according to the detected results by the redundant data detecting means.

In the above-mentioned embodiment, the retrieval result processing means includes a standard structure extracting means for taking data corresponding to predetermined items out of the retrieval results obtained through retrieval processing by the retrieval executing means, and the retrieval result supplying means includes a redundant data detecting means for detecting the data having the identical content as for all the items by comparison among the respective items of the data taken by the standard structure extracting means, and a merge screen forming means for forming a display screen to be supplied to the display after unifying the identical data and eliminating the redundant data according to the detected results by the redundant data detecting means, the redundant data detecting means, when detecting some retrieval results short of data on a part of items in the above data taken by the standard structure extracting means, relating the retrieval results to the other retrieval results if there are other retrieval results having the data on the remaining item identical with the retrieval results short of the data on the part of items, the merge screen forming means, when the redundant data detecting means detects the retrieval results short of the data on a part of items in the above taken data and there are other retrieval results related to the retrieval results short of the data on the part of items, placing the retrieval results short of the data on the part of items next to the other retrieval results.

In the above-mentioned embodiment, the retrieval result processing means includes a standard structure extracting means for taking data corresponding to predetermined items out of the retrieval results obtained through retrieval processing by the retrieval executing means, and the retrieval result supplying means includes a redundant data detecting means for detecting the data having the identical content as for all the items by comparison among the respective items of the data taken by the standard structure extracting means, and a merge screen forming means for forming a display screen to be supplied to the display after unifying the identical data and eliminating the redundant data according to the detected results by the redundant data detecting means, the redundant data detecting means, when detecting some retrieval results short of data on a part of items in the above data taken by the standard structure extracting means, relating the retrieval results to the other retrieval results if there are other retrieval results having the data on the remaining item identical with the retrieval results short of the data on the part of items, the merge screen forming means, when the redundant data detecting means detects the retrieval results short of the data on a part of items in the above taken data and there are other retrieval results related to the retrieval results short of the data on the part of items, placing the retrieval results short of the data on the part of items next to the other retrieval results and presenting the retrieval results short of the data on the part of items in a display format different from the other retrieval results.

Also, the retrieval executing means includes a retrieval monitoring means for monitoring executing condition of retrieval processing for the data base of the retrieved party, the retrieval result processing means includes a retrieval termination display control means for supplying the retrieval results of the data base having completed the retrieval processing to the display according to the monitoring results by the retrieval monitoring means, and a standard structure extracting means for taking data corresponding to predetermined items out of the retrieval results obtained through retrieval processing by the retrieval executing means, and the retrieval result supplying means includes a redundant data detecting means for detecting the data having the identical content as for all the items by comparison among the respective items of the data taken by the standard structure extracting means, and a merge screen forming means for forming a display screen to be supplied to the display after unifying the identical data and eliminating the redundant data, according to the detected results by the redundant data detecting means.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to limit the invention, but are for explanation and understanding only. In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to clearly show the present invention.

In the embodiment, the description will be made in the case where an information retrieval system of the present invention is applied to the book retrieval.

Figure 1:
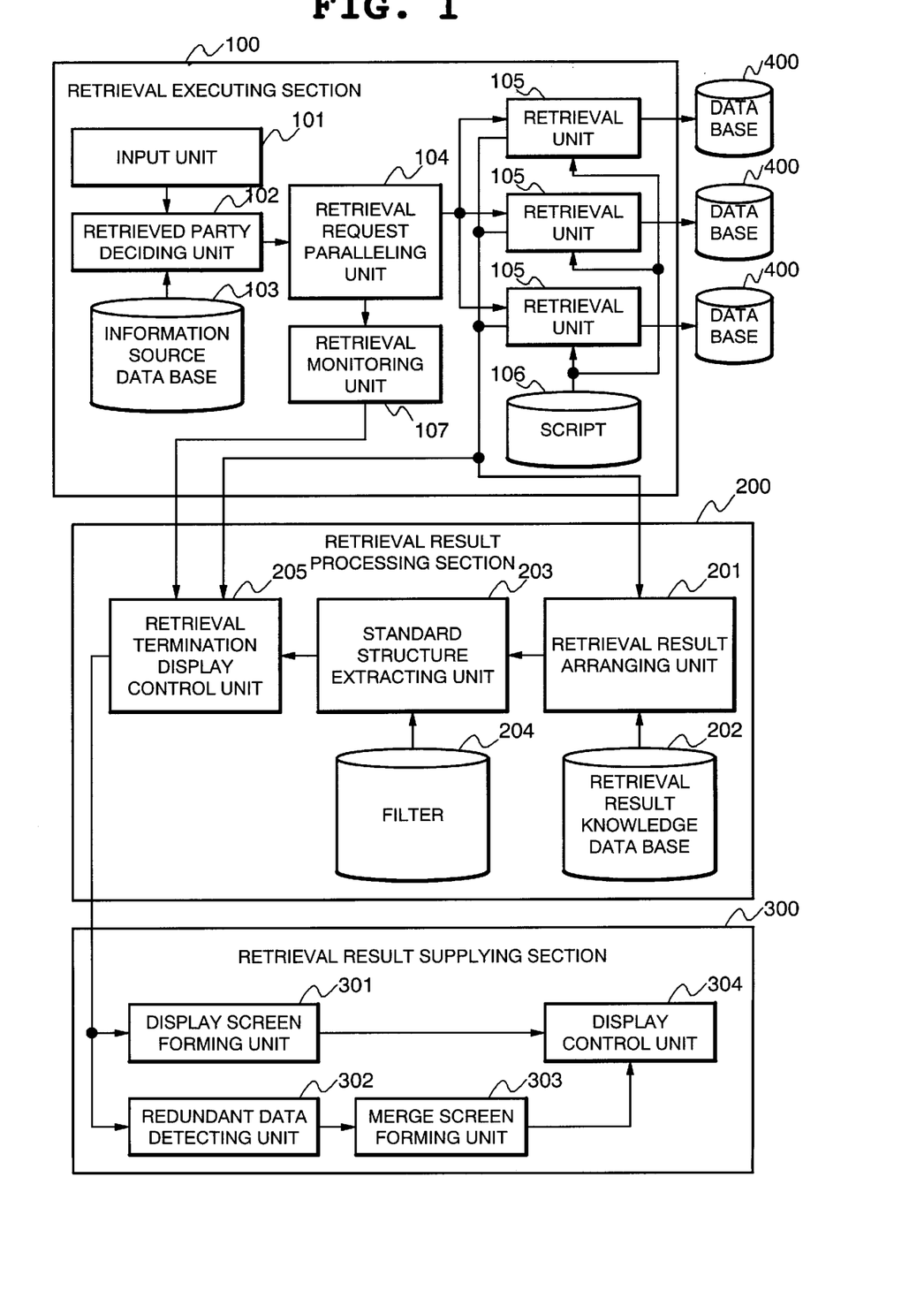
FIG. 1 is a block diagram showing an embodiment of an information retrieval system according to the present invention.

FIG. 1 is a block diagram showing an embodiment of an information retrieval system according to the present invention. With reference to FIG. 1, the information retrieval system of the present invention comprises a retrieval executing section 100 for executing retrieval processing upon receipt of a retrieval condition, a retrieval result processing section 200 for processing the retrieval results, and a retrieval result supplying section 300 for supplying the retrieval results. The retrieval executing section 100 is connected to a plurality of data bases 400 via a network. FIG. 1 shows only the characteristic components of the invention, while other general components are not shown there.

The retrieval executing section 100 includes an input unit 101 for receiving a retrieval request, an information source data base 103 and a retrieved-party deciding unit 102 for deciding a data base to be retrieved according to the received retrieval request, a retrieval request paralleling unit 104 for making the retrieval request parallel, a retrieval unit 105 for executing data retrieval, a script 106 which is used by the retrieval unit 105, and a retrieval monitoring unit 107 for monitoring the data retrieval by the retrieval unit 105.

The input unit 101 may be realized by an input device such as a key board, a mouse, or the like. The unit 101 receives a retrieval request including a key word that is a retrieval condition and information for specifying a data base that a user desires to retrieve (for example, name and ID of a data base, which is hereinafter referred to as data base name) and sends it to the retrieved-party deciding unit 102. It is possible to enter a plurality of key words and data base names.

Figure 2:
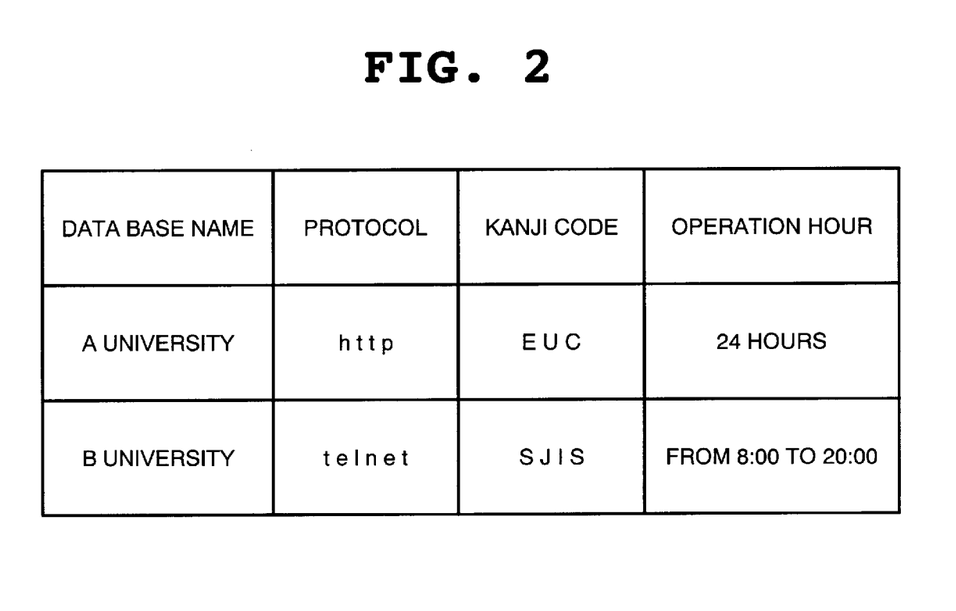
FIG. 2 shows one example of knowledge stored in a data base of information source according to the embodiment.

The retrieved-party deciding unit 102 may be realized by, for example, a CPU controlled by a program and an internal memory such as a RAM or the like. The unit 102 selects a retrievable information source (data base) according to the knowledge stored in the information source data base 103. The information source data base 103 may be realized by, for example, an internal memory such as a RAM or the like, or an external storage such as a magnetic disk or the like, and it stores knowledge on an accessible data base. FIG. 2 shows an example of the knowledge stored in the information source data base 103. With reference to FIG. 2, data base name, communication protocol, KANJI code for use in the information source, and service hour (operation hour) are described in every data base of information source. The knowledge shown in FIG. 2 is described as only an example, and needless to say, various kinds of information, if necessary, may be described there.

The retrieved-party deciding unit 102 judges whether a data base corresponding to the data base name included in a retrieval request received by the input unit 101 is now in the service hour by reference to the above-mentioned knowledge stored in the information source data base 103. If it is in the service hour, the retrieved-party deciding unit 102 decides the data base as a retrieved party. The unit 102 obtains the information on the decided data base and delivers it to the retrieval request paralleling unit 104 as the retrieved-party information. While, if a data base corresponding to the data base name included in a retrieval request is out of the service hour, the unit 102 breaks the rest of processing and notifies a user that the data base is out of the service hour, thereby finishing the processing. When a plurality of data base names are designated in a retrieval request and some of the data bases are out of the service hour, the unit 102 notifies a user that they are out of the service hour and continues the further processing with respect to the remaining data bases in the service hour. The retrieved-party information 310 is automatically created by the retrieved-party deciding unit 102, without being displayed for a user.

Figure 3:
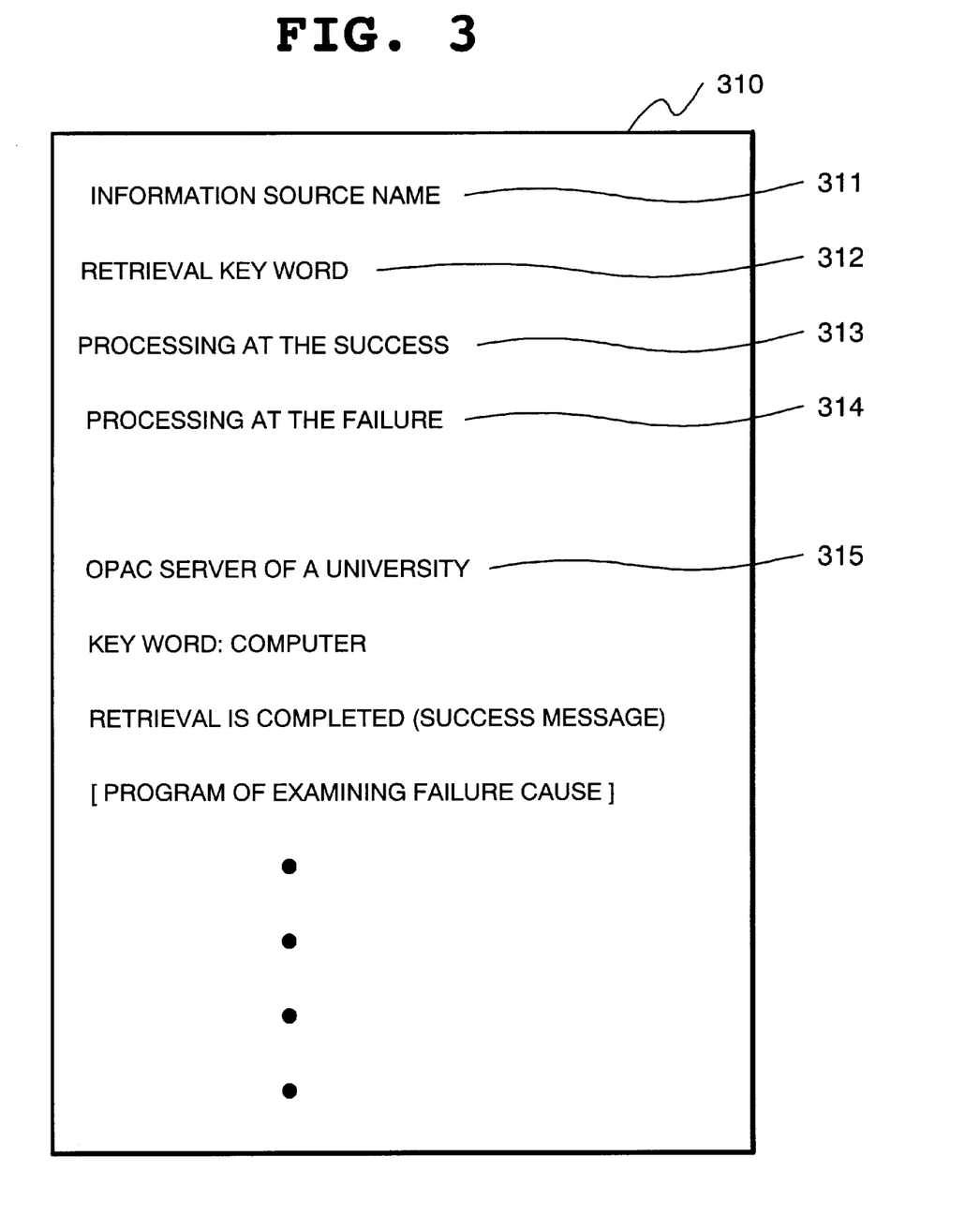
FIG. 3 shows one example of retrieved-party information to be sent from a retrieved-party deciding unit to a retrieval request paralleling unit according to the embodiment.

FIG. 3 shows an example of retrieved-party information to be delivered from the retrieved-party deciding unit 102 to the retrieval request paralleling unit 104. The example shown in FIG. 3 is the retrieved-party information 310 in the case where the party to be retrieved is the OPAC (Online Public Access Catalogue) server of a published university and the key word of the retrieval a user entered is "computer". With reference to FIG. 3, the retrieved-party information 310 includes the information on a data base that the retrieved-party deciding unit 102 judges to be accessible because of being in the service hour. Further, the information 310 includes the content of the processing at the success of retrieval of the data base and the content of the processing at the failure of the retrieval, in consideration of the branch of the retrieval processing.

The retrieval request paralleling unit 104 may be realized by, for example, a CPU controlled by a program and an internal memory such as a RAM or the like. The unit 104 activates the same number of the retrieval units 105 as the number of the data bases to be retrieved, by reference to the information source name 311 and the retrieval key word 312 of the retrieved-party information 310. The rest part of the retrieved-party information 310, that is, the content of the processing at the success of retrieval 313 and the content of the processing at the failure of retrieval 314 is delivered to the retrieval monitoring unit 107.

Figure 4:
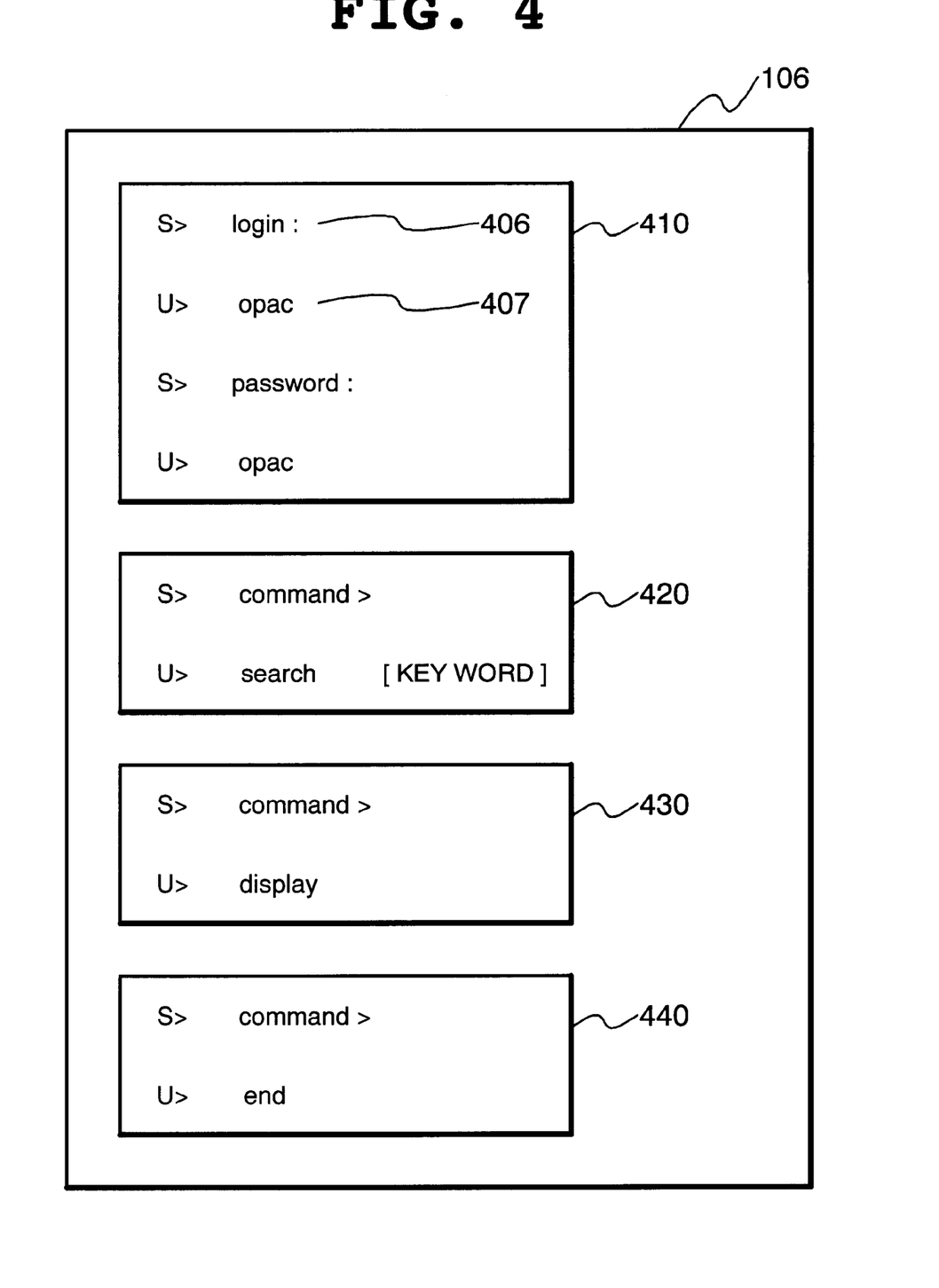
FIG. 4 shows one example of script according to the embodiment.

The retrieval unit 105 may be realized by, for example, a CPU controlled by a program and an internal memory such as a RAM or the like. The unit 105 retrieves information from a desired data base 400 according to the script 106 and the retrieved-party information 310 delivered from the retrieval request paralleling unit 104. The script 106 means the knowledge including a sequential retrieval procedure. FIG. 4 shows an example of the content of the script 106. With reference to FIG. 4, the script is divided into a connection part 410 to a data base, a retrieval part 420, a result display part 430, and a disconnection part 440. Further the script 106 includes a character string showing response from a data base and a character string supplied from a retrieval unit 105. The retrieval unit 105 reads the script from the head and when the character string "login:" 406 is supplied from the system, it returns the character string "opac" 407. In the actual retrieval, the retrieval unit 105 converts a retrieval request into a retrieval expression of the format used in a data base to be accessed by use of the script 106 and the retrieval key word 312 included in the retrieved-party information 310, so to do the data retrieval. As mentioned above, the script 106 is used to control the operation of the retrieval unit 105, thereby making it possible to deal with many kinds of data bases.

The retrieval monitoring unit 107 may be realized by, for example, a CPU controlled by a program and an internal memory such as a RAM or the like. The unit 107 receives the processing content 313 at the success of retrieval and the processing content 314 at the failure of retrieval from the retrieval request paralleling unit 104 and monitors each retrieval unit 105 activated by the retrieval request paralleling unit 104. The operation of the retrieval monitoring unit 107 will be described with reference to the flow chart of FIG. 5.

Figure 5:
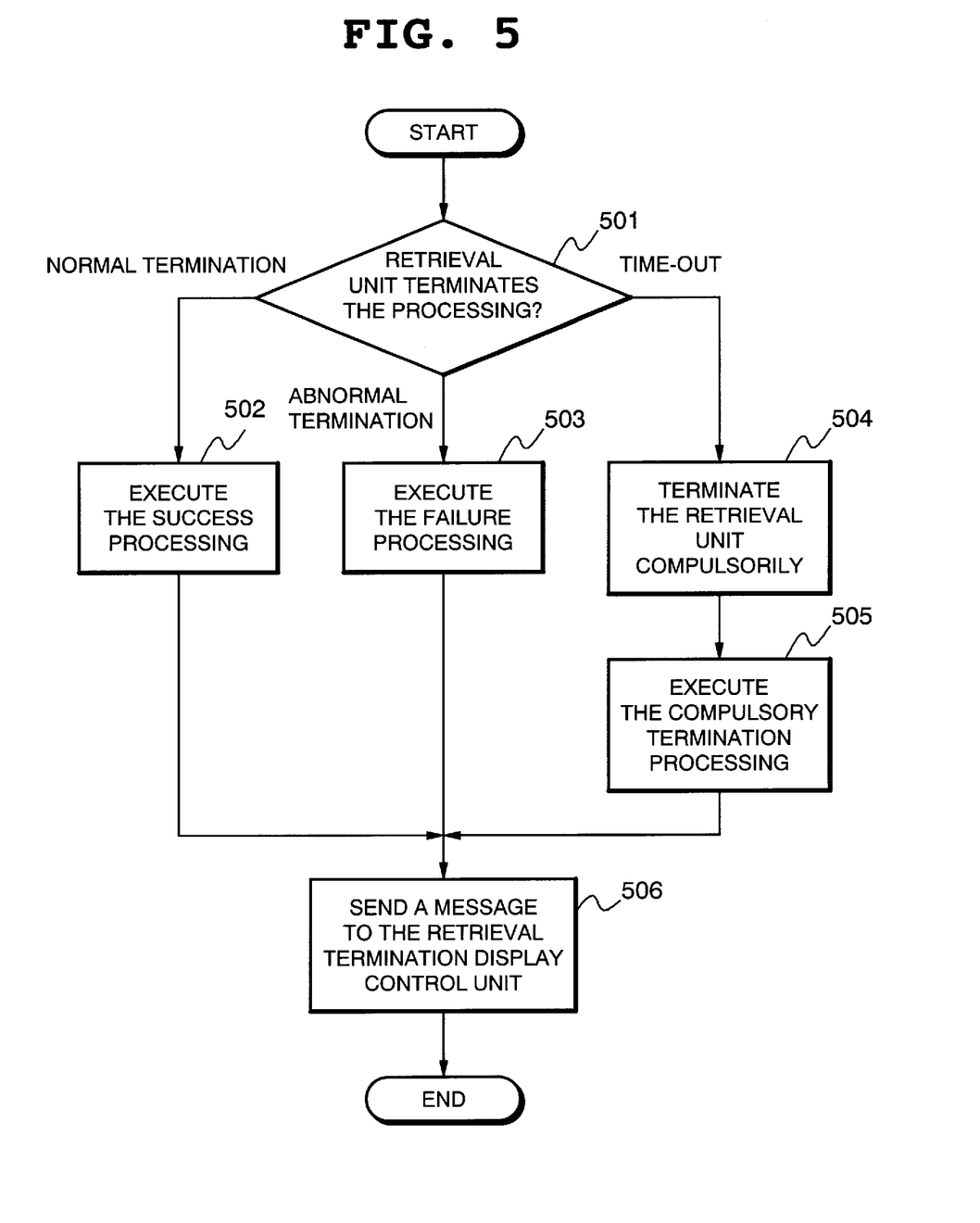
FIG. 5 is a flow chart showing the operation of a retrieval monitoring unit according to the embodiment.

When each retrieval unit 105 completes the script 106 to the end, the retrieval monitoring unit 107 is informed of the normal termination (Step 501). The retrieval monitoring unit 107, having obtained the information of the normal termination, executes the processing content 313 at the success of retrieval described in the retrieved-party information 310 (Step 502). In the processing 313 at the success of retrieval, the number of obtained retrieval results is counted and a message informing a user of the resultant number is presented to a user (Step 506). The retrieval unit 105 sends the obtained retrieval results to the retrieval result processing section 200.

When the retrieval prematurely terminates in the middle of the script 106, the retrieval unit 105 judges that the retrieval is terminated abnormally and informs the retrieval monitoring unit 107 of the abnormal termination (Step 501). The retrieval monitoring unit 107 having obtained the information of the abnormal termination executes the processing 314 at the failure of retrieval (Step 503). In the processing 314 at the failure of retrieval, retrieval results halfway obtained are checked, it is judged whether connection to an information source failed or retrieval has been halfway suspended, and the failure of retrieval and the cause of the failure are presented to a user (Step 506).

The retrieval monitoring unit 107 is measuring the retrieval time by a retrieval unit 105. When the measured time is beyond the predetermined time limit, the retrieval monitoring unit 107 terminates the retrieval unit 105 compulsorily (Steps 501 and 504). The unit 107 executes the processing 314 at the failure of retrieval of the retrieved-party information 310 (Steps 505 and 506).

As illustrated in FIG. 1, the retrieval result processing section 200 includes a retrieval result arranging unit 201 receiving retrieval results by the retrieval unit 105 of the retrieval executing section 100 for arranging them properly, a retrieval result knowledge data base 202, a standard structure extracting unit 203 and a filter 204, and a retrieval termination display control unit 205 for showing the retrieval results on a display.

Figure 6:
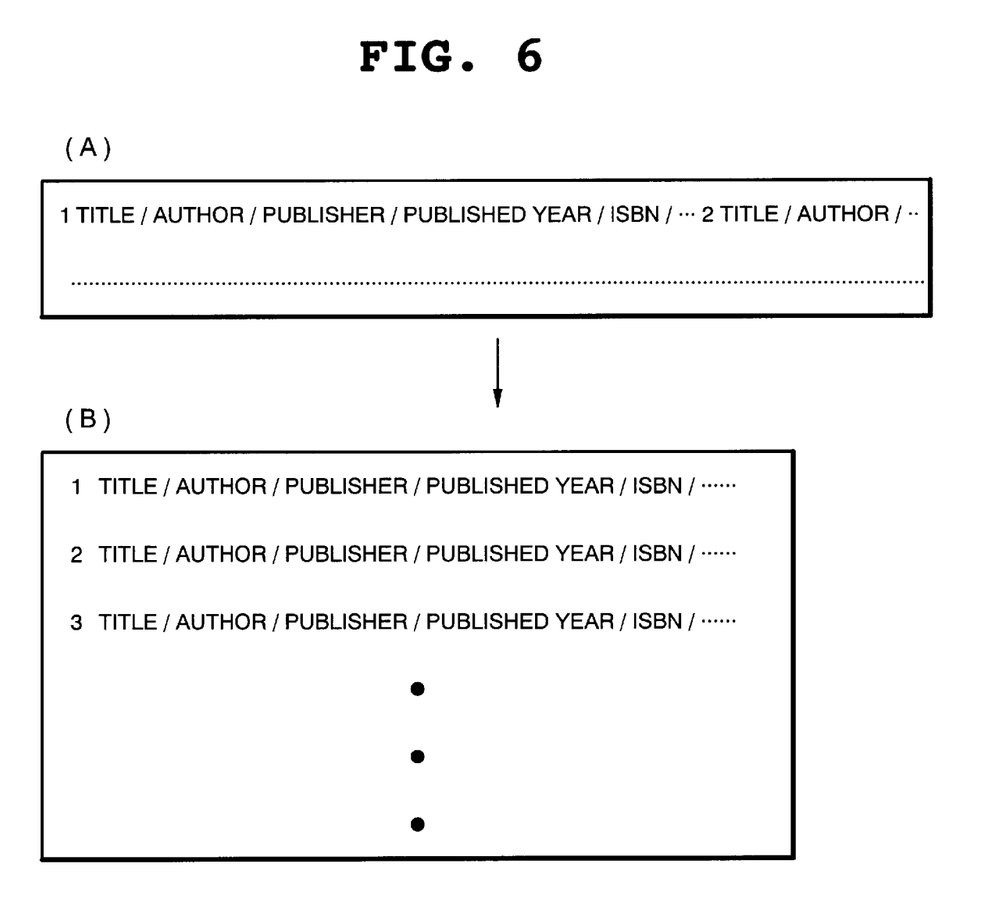
FIG. 6 shows an example of retrieval results obtained through retrieval of a data base and an arrangement example of the retrieval results by a retrieval result arranging unit of the embodiment.
Figure 7:
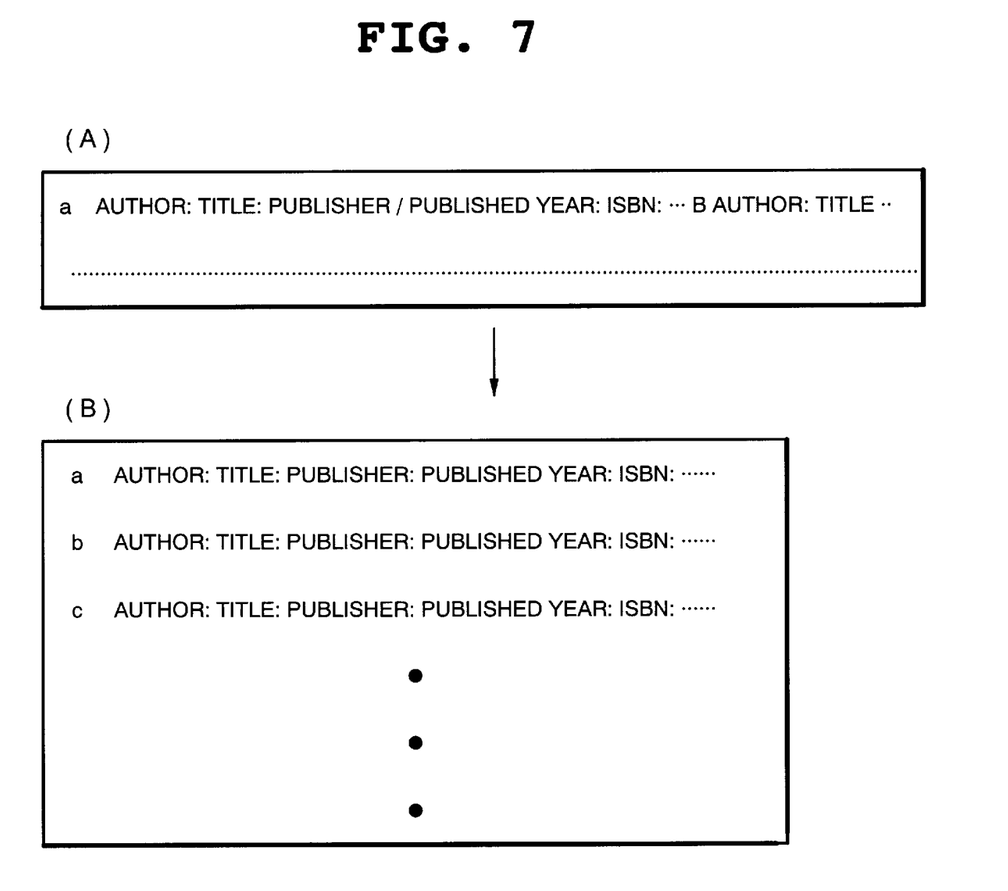
FIG. 7 shows another example of retrieval results obtained through retrieval of a data base and an arrangement example of the retrieval results by a retrieval result arranging unit of the embodiment.
Figure 8:
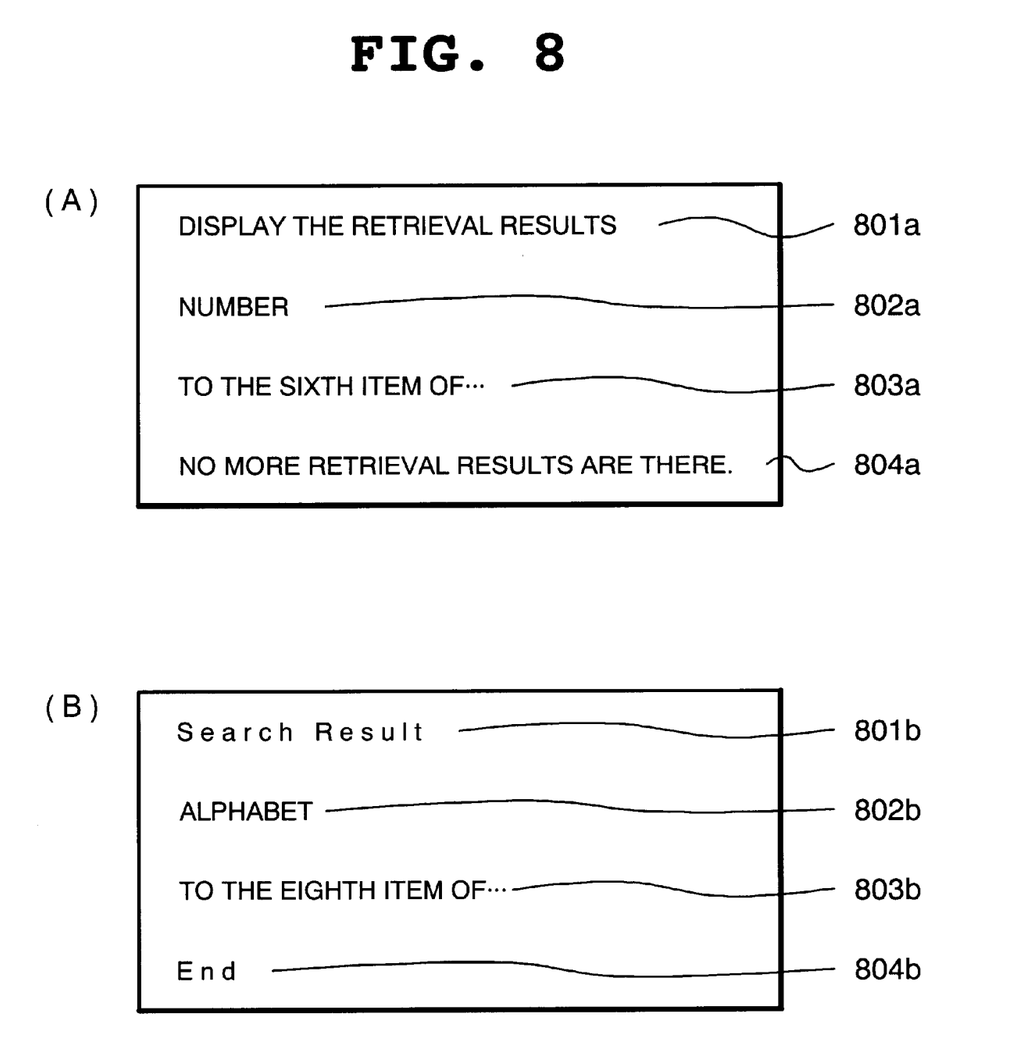
FIG. 8 shows one example of knowledge stored in a retrieval result knowledge data base of the embodiment.

The retrieval result arranging unit 201 may be realized by, for example, a CPU controlled by a program and an internal memory such as a RAM or the like. The unit 201, upon receipt of the retrieval results supplied from the retrieval unit 105, arranges them so that they can be easily processed. For example, assuming that the data base 400 is a document data base and that the retrieval results as shown in FIGS. 6(A) and 7(A) are obtained, the unit 201 arranges the retrieval results into data files including each one document data in every one line as illustrated in FIGS. 6(B) and 7(B). Reference to the retrieval result knowledge data base 202, in the arrangement processing of the retrieval results by the retrieval result arranging unit 201, enables more accurate processing. When arranging each retrieval result into a data file including one document in every one line as illustrated in FIGS. 6 and 7, the knowledge for cutting off only one document from the obtained retrieval results is stored in the retrieval result knowledge data base 202. FIGS. 8(A) and (B) are views for use in explaining the knowledge the retrieval result knowledge data base 202 holds. FIG. 8(A) shows an example of knowledge on the data stored in the OPAC server in the format shown in FIG. 6(A), and FIG. 8(B) shows an example of knowledge on the data stored in the OPAC server in the format shown in FIG. 7(A). Two kinds of knowledge in FIG. 8 are shown as an example, and it is needless to say that various knowledge set up depending on the type of data base 400 is stored in the retrieval result knowledge data base 202.

The retrieval result arranging unit 201 takes out a necessary part from the character string of the retrieval results sent from the information source (data base 400), if necessary, by use of the knowledge of the retrieval result knowledge data base 202, in order to arrange the retrieval results appropriately. The explanation will be made by reference to the examples of FIGS. 6 to 8. If the retrieval results as shown in FIG. 6(A) are obtained, the retrieval result arranging unit 201 judges that the knowledge within the retrieval result knowledge data base 202 in accordance with the same retrieval results is the knowledge shown in FIG. 8(A), and detects the display starting character string 801a from the retrieval data. The display starting character string 801a is the character string displayed first when retrieving information from the data base 400 (OPAC server) corresponding to this knowledge. Namely, in the retrieval of the data base 400, this character string is inserted at the beginning of the retrieval data.

Next, reading the retrieval data sequentially, the arranging unit 201 detects the document starting character string 802a and further searches for the document ending character string 803a. When detecting the document ending character string 803a, the information from the document starting character string 802a to the document ending character string 803a is regarded as the information for one document, so to start a new paragraph. The same processing will be repeated until the display termination character string 804a is detected. Thus, only the information specified by the knowledge of FIG. 8(A) is taken out from the obtained retrieval results, and the arrangement results can be obtained, which have been described as each one document in every one line as shown in FIG. 6(B).

If the retrieval results as shown in FIG. 7(A) are obtained, the retrieval result arranging unit 201 judges that the knowledge within the retrieval result knowledge data base 202 in accordance with this retrieval results is the knowledge as shown in FIG. 8(B). By detecting the display starting character string 801b and sequentially taking out the part intervening between the document starting character string 802b and the document ending character string 803c, arrangement results as shown in FIG. 7(B) can be obtained which have been described as each one document in every one line.

As mentioned above, retrieval results can be arranged in a desired format by selecting knowledge within a proper retrieval result knowledge data base 202 according to the retrieved party and taking out the necessary information from the retrieval results for its arrangement.

The standard structure extracting unit 203 may be realized by, for example, a CPU controlled by a program and an internal memory such as a RAM or the like. The unit 203, upon receipt of the retrieval results arranged by the retrieval result arranging unit 201, takes out a necessary set of items from the description on each document. In the description below, a set of items extracted by the standard structure extracting unit 203 is referred to as standard structure data. When the standard structure extracting unit 203 extracts standard structure data, the filter 204 is used to decide items to be taken out and judge where the items are included in the description about the document in the retrieval results. The filter 204 has the description about items to be taken out from the retrieval results and the position of items such as title, author, and publisher in the retrieval results of each document. Therefore, only necessary items can be accurately taken out from the retrieval results by the use of the filter 204.

Figure 9:
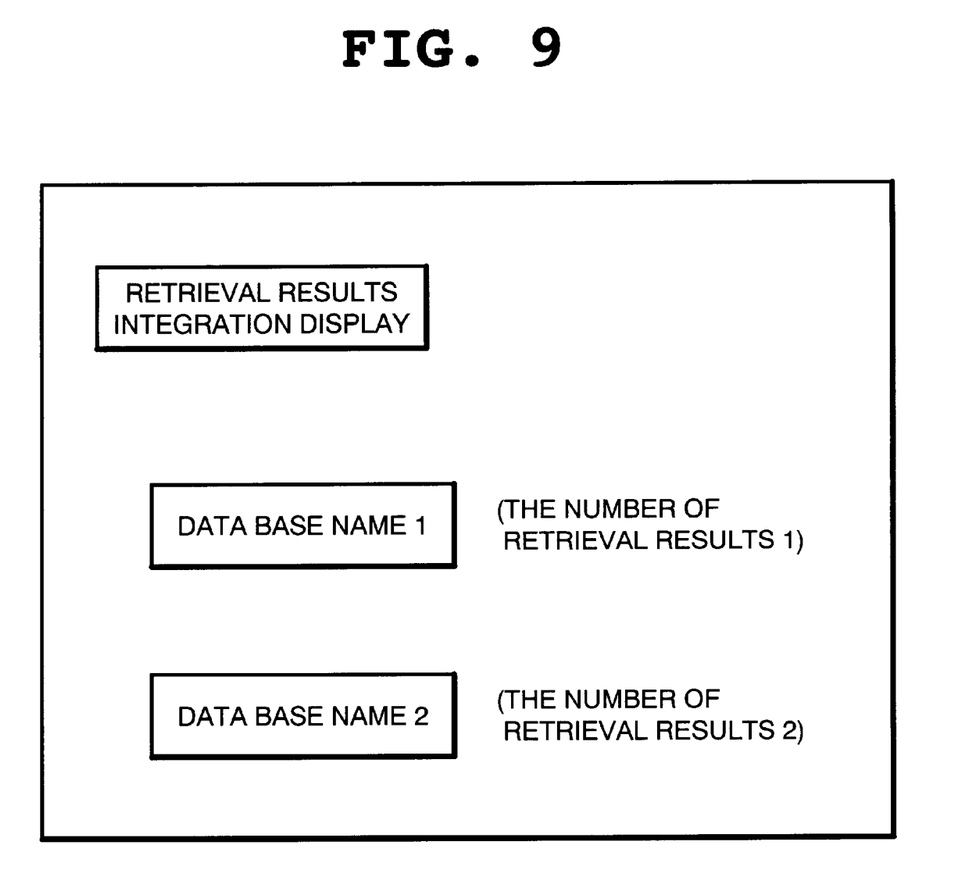
FIG. 9 is a view showing a display screen supplied to a display by a retrieval termination display control unit of the embodiment.

The retrieval termination display control unit 205 may be realized by, for example, a CPU controlled by a program and an internal memory such as a RAM or the like. Receiving notice of retrieval termination sequentially from the retrieval unit 105 that has completed retrieval, the unit 205 sequentially supplies a message of the retrieval termination to the display in the order of receiving the notice. The display content depends on the condition where the retrieval unit 105 terminates. Owing to this, the retrieval results can be displayed in the order in which the retrieval has been completed, and the abnormally terminated processing can be displayed in a different format from that of other retrieval processing, so that a user can understand the retrieval condition at once. FIG. 9 shows an example of a message screen to be supplied to a display by the retrieval termination display control unit 205. With reference to FIG. 9, the character string "Retrieval Results Integration Display", and the data base name as well as the number of retrieval results for every data base 400 having completed the retrieval are described on the message screen. Each character string of "Retrieval Results Integration Display" and "Data base Name" surrounded by square is a button supplied by a graphical user interface, and if clicking the button by use of a mouse or other pointing device, the screen is switched to the further detailed display supplied by the retrieval result supplying section 300.

As illustrated in FIG. 1, the retrieval result supplying section 300 comprises a display screen forming unit 301 for forming a display screen according to a given display format, a redundant data detecting unit 302 for detecting redundant data from the retrieval results, a merge screen forming unit 303 for forming a display screen according to the detected results by the redundant data detecting unit 302, and a display control unit 304 for supplying to a display a display screen formed by the display screen forming unit 301 and the merge screen forming unit 303.

The display screen forming unit 301 may be realized by, for example, a CPU controlled by a program and an internal memory such as a RAM or the like, and it is activated by clicking the button "Data base Name" on the message screen supplied to a display by the retrieval termination display control unit 205 of the retrieval result processing section 200. The unit 301 forms a display screen in a predetermined display format, based on the data taken by the standard structure extracting unit 203, out of the retrieval results in the data base 400 corresponding to the data base name. The formed display screen of the retrieval results is passed to the display control unit 304 so to be supplied to a display.

The redundant data detecting unit 302 may be realized by, for example, a CPU controlled by a program and an internal memory such as a RAM or the like, and it is activated by clicking the button "Retrieval Results Integration Display" on the message screen supplied to a display by the retrieval termination display control unit 205 of the retrieval result processing section 200. The unit 302 detects the identical data (redundant data) by comparison among the standard structure data of each data base 400. For example, when the standard structure data includes three items of title, author, and publisher, it judges whether each data has the same content as for these three items. When some items of data are lacking in the given standard structure data, inevitably the number of items for judging the identity is decreased. In this case, detection of redundant data is not performed on such standard structure data, in order to prevent from judging mistake that the standard structure data of different content is taken for the identical data because of comparison by use of a few items.

Figure 10:
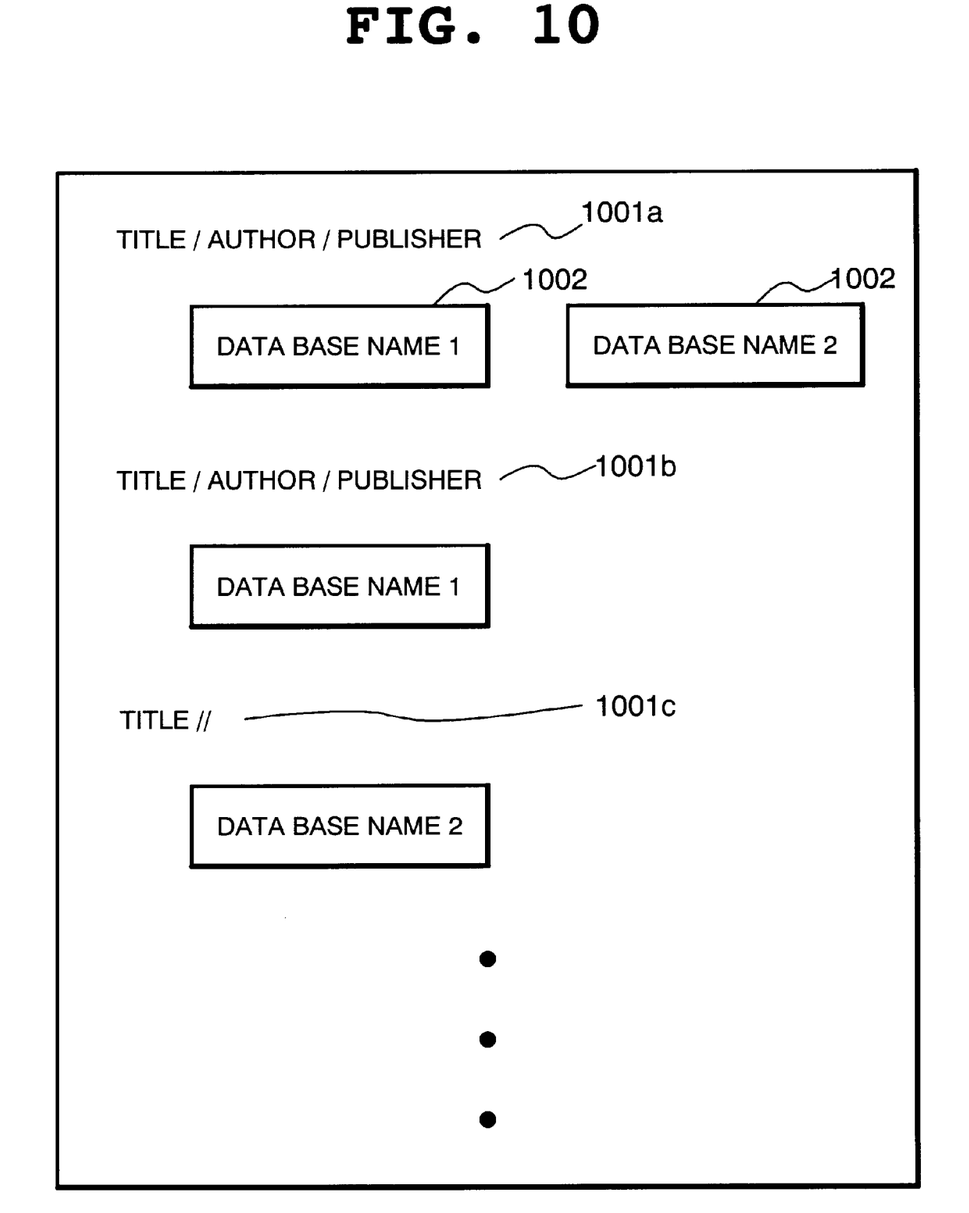
FIG. 10 is a view showing a display screen formed by a merge screen forming unit and supplied to a display by a screen display control unit according to the embodiment.

The merge screen forming unit 303 may be realized by, for example, a CPU controlled by a program and an internal memory such as a RAM or the like. The unit 303 forms a display screen in a predetermined display format, based on the retrieval results by the redundant data detecting unit 302. FIG. 10 shows an example of a display screen formed by the merge screen forming unit 303. With reference to FIG. 10, the data base name 1002 of the data base 400 from which the retrieval results have been obtained is described in every retrieval result 1001 with each item of the standard structure data aligned.

When there are some retrieval results short of the data on some items of the standard structure data and there is other standard structure data having the identical data on the remaining items with the above retrieval results, the retrieval results short of the data are shown next to the retrieval results having the other standard structure data. For example, in FIG. 10, when the standard structure data of the retrieval result 1001*c* has only the data on the title item, it is shown next to the retrieval result 1001*b* having the identical title with this title. Namely, because it has a small item of standard structure data for comparison, the retrieval result 1001*b* and the retrieval result 1001*c* are separately displayed in order to prevent from misjudgment. However, standing the two retrieval results 1001*b* and 1001*c* adjacently enables a user to make a comparison therebetween easily. The display font of the retrieval result 1001*c* may be changed in order to distinguish it from the general retrieval result 1001 easily.

As set forth hereinabove, according to the information retrieval system of the present invention, since the retrieval results are displayed in the order in which the retrieval processing has been completed, it is not necessary to wait until the retrieval processing for all the data bases has been completed, thereby shortening the waiting time for obtaining retrieval results.

Further, the information retrieval system of the present invention is capable of interrupting the retrieval processing of a data base of especially poor response, while monitoring the executing condition of the retrieval processing, thereby improving the whole retrieval speed.

Owing to this, even if accessing to data bases dispersed over a network, the information retrieval system of the present invention is capable of dealing with the difference in response time in every data base and the difference in burden of the network, thereby improving the retrieval speed to do efficient retrieval processing.

Further, it is capable of processing the retrieval results obtained from a plurality of data bases into a common format so to supply them to a display, thereby making a user's evaluation work easy.

After obtaining the retrieval results from all the data bases, the information retrieval system of the present invention is capable of eliminating the overlapping retrieval results, so to supply them to a display and adjacently positioning the retrieval results which may overlap with each other, thereby making a user's evaluation work easier.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. An information retrieval system for presenting information by processing retrieval results obtained through data retrieval by access to data bases dispersed on a network, comprising:

a retrieval executing section for, upon receipt of an access request from a user, specifying a data base as a retrieved party and retrieving data from the specified data base, and, in case of specifying a plurality of data bases as the retrieved party, retrieving data in parallel from the plurality of data bases;

a retrieval result processing section for processing retrieval results obtained through retrieval processing by said retrieval executing section and converting the same in a standard format; and a retrieval result supplying section for supplying the retrieval results processed by said retrieval result processing section to a display, wherein the retrieval result processing section includes a retrieval result arranging unit and a retrieval result knowledge database so that the retrieval result arranging unit converts the retrieval results to the standard format by using a knowledge stored in the retrieval result knowledge database.

2. An information retrieval system as set forth in claim 1, wherein said retrieval executing section includes a retrieval monitoring unit for monitoring executing condition of retrieval processing for the data base of the retrieved party, and said retrieval result processing section includes a retrieval termination display control unit for supplying the retrieval results of the data base having completed the retrieval processing to the display according to the monitoring results by said retrieval monitoring unit.

3. An information retrieval system as set forth in claim 1, wherein said retrieval executing section includes a retrieval monitoring unit for monitoring executing condition of retrieval processing for the data base of the retrieved party, and said retrieval result processing section includes a retrieval termination display control unit for supplying the retrieval results of the data base having completed the retrieval processing to the display according to the monitoring results by said retrieval monitoring unit, said retrieval monitoring unit, if detecting abnormally terminated retrieval processing, notifying it to said retrieval termination display control unit, said retrieval termination display control unit supplying a message indicating the occurrence of the abnormal termination to the display upon receipt of the notice of detecting the abnormally terminated retrieval processing from said retrieval monitoring unit.

4. An information retrieval system as set forth in claim 1, wherein said retrieval executing section includes a retrieval monitoring unit for monitoring executing condition of retrieval processing for the data base of the retrieved party, and said retrieval result processing section includes a retrieval termination display control unit for supplying the retrieval results of the data base having completed the retrieval processing to the display according to the monitoring results by said retrieval monitoring unit, said retrieval monitoring unit measuring running time of retrieval processing in the respective data bases, breaking the retrieval processing if the measured time is beyond a predetermined time limit, and notifying it to said retrieval termination display control unit, said retrieval termination display control unit supplying a message indicating the occurrence of the abnormal termination to the display, upon receipt of the notice, from said retrieval monitoring unit, informing that the processing has been terminated because the running time of the retrieval processing was beyond the time limit.

5. An information retrieval system as set forth in claim 1, in which said retrieval executing section includes a retrieval monitoring unit for monitoring executing condition of retrieval processing for the data base of the retrieved party, and said retrieval result processing section includes a retrieval termination display control unit for supplying the retrieval results of the data base having completed the retrieval processing to the display according to the monitoring results by said retrieval monitoring unit, said retrieval monitoring unit, if detecting abnormally terminated retrieval processing, notifying it to said retrieval termination display control unit, measuring running time of retrieval processing in the respective data bases, breaking the retrieval processing if the measured time is beyond a predetermined time limit, and notifying it to said retrieval termination display control unit, said retrieval termination display control unit supplying a message indicating the occurrence of the abnormal termination to the display upon receipt of the notice of detecting the abnormally terminated retrieval processing from said retrieval monitoring unit, and supplying a message indicating the occurrence of the abnormal termination to the display, upon receipt of the notice, from said retrieval monitoring unit, informing that the processing has been terminated because the running time of the retrieval processing was beyond the time limit.

6. An information retrieval system for presenting information by processing retrieval results obtained through data retrieval by access to data bases dispersed on a network, comprising:

a retrieval executing section for, upon receipt of an access request from a user, retrieving data from the data base after specifying a data base as a retrieved party and retrieving data from the specified data base, and, in case of specifying a plurality of data bases as the retrieved party, retrieving data in parallel from the plurality of data bases;

a retrieval result processing section for processing retrieval results obtained through retrieval processing by said retrieval executing section and converting the same in a standard format; and a retrieval result supplying section for supplying the retrieval results processed by said retrieval result processing section to a display, in which:

said retrieval result processing section includes a standard structure extracting unit for taking data corresponding to predetermined items out of the retrieval results obtained through retrieval processing by said retrieval executing section, and said retrieval result supplying section includes a redundant data detecting unit for detecting the data having the identical content as for all the items by comparison among the respective items of the data taken by said standard structure extracting unit, and a merge screen forming unit for forming a display screen to be supplied to the display after unifying the identical data and eliminating the redundant data, according to the detected results by said redundant data detecting unit.

7. An information retrieval system for presenting information by processing retrieval results obtained through data retrieval by access to data bases dispersed on a network, comprising:

a retrieval executing section for, upon receipt of an access request from a user, retrieving data from the data base after specifying a data base as a retrieved party and retrieving data from the specified data base, and, in case of specifying a plurality of data bases as the retrieved party, retrieving data in parallel from the plurality of data bases;

a retrieval result processing section for processing retrieval results obtained through retrieval processing by said retrieval executing section and converting the same in a standard format; and a retrieval result supplying section for supplying the retrieval results processed by said retrieval result processing section to a display, in which:

said retrieval result processing section includes
   a standard structure extracting unit for taking data corresponding to predetermined items out of the retrieval results obtained through retrieval processing by said retrieval executing unit, and said retrieval result supplying unit includes
   a redundant data detecting unit for detecting the data having the identical content as for all the items by comparison among the respective items of the data taken by said standard structure extracting unit, and
   a merge screen forming unit for forming a display screen to be supplied to the display after unifying the identical data and eliminating the redundant data according to the detected results by said redundant data detecting unit,
   wherein said redundant data detecting unit, when detecting some retrieval results short of data on a part of items in the above data taken by said standard structure extracting unit, relating the retrieval results to the other retrieval results if there are other retrieval results having the data on the remaining item identical with the retrieval results short of the data on the part of items, and
   wherein said merge screen forming unit, when said redundant data detecting unit detects the retrieval results short of the data on a part of items in the above taken data and there are other retrieval results related to the retrieval results short of the data on the part of items, placing the retrieval results short of the data on the part of items next to the other retrieval results.

8. An information retrieval system for presenting information by processing retrieval results obtained through data retrieval by access to data bases dispersed on a network, comprising:

a retrieval executing section for, upon receipt of an access request from a user, retrieving data from the data base after specifying a data base as a retrieved party and retrieving data from the specified data base, and, in case of specifying a plurality of data bases as the retrieved party, retrieving data in parallel from the plurality of data bases;

a retrieval result processing section for processing retrieval results obtained through retrieval processing by said retrieval executing section and converting the same in a standard format; and a retrieval result supplying section for supplying the retrieval results processed by said retrieval result processing section to a display, in which:

said retrieval result processing section includes
   a standard structure extracting unit for taking data corresponding to predetermined items out of the retrieval results obtained through retrieval processing by said retrieval executing section, and said retrieval result supplying section includes
   a redundant data detecting unit for detecting the data having the identical content as for all the items by comparison among the respective items of the data taken by said standard structure extracting unit, and
   a merge screen forming unit for forming a display screen to be supplied to the display after unifying the identical data and eliminating the redundant data according to the detected results by said redundant data detecting unit,
   wherein said redundant data detecting unit, when detecting some retrieval results short of data on a part of items in the above data taken by said standard structure extracting unit, relating the retrieval results to the other retrieval results if there are other retrieval results having the data on the remaining item identical with the retrieval results short of the data on the part of items, and
   wherein said merge screen forming unit, when said redundant data detecting unit detects the retrieval results short of the data on a part of items in the above taken data and there are other retrieval results related to the retrieval results short of the data on the part of items, placing the retrieval results short of the data on the part of items next to the other retrieval results and presenting the retrieval results short of the data on the part of items in a display format different from the other retrieval results.

9. An information retrieval system for presenting information by processing retrieval results obtained through data retrieval by access to data bases dispersed on a network, comprising:

a retrieval executing section for, upon receipt of an access request from a user, retrieving data from the data base after specifying a data base as a retrieved party and retrieving data from the specified data base, and, in case of specifying a plurality of data bases as the retrieved party, retrieving data in parallel from the plurality of data bases;

a retrieval result processing section for processing retrieval results obtained through retrieval processing by said retrieval executing section and converting the same in a standard format; and a retrieval result supplying section for supplying the retrieval results processed by said retrieval result processing section to a display, wherein said retrieval executing section includes
   a retrieval monitoring means for monitoring executing condition of retrieval processing for the data base of the retrieved party, wherein said retrieval result processing section includes
   a retrieval termination display control unit for supplying the retrieval results of the data base having completed the retrieval processing to the display according to the monitoring results by said retrieval monitoring unit, and
   a standard structure extracting unit for taking data corresponding to predetermined items out of the retrieval results obtained through retrieval processing by said retrieval executing section, and wherein said retrieval result supplying section includes
   a redundant data detecting unit for detecting the data having the identical content as for all the items by comparison among the respective items of the data taken by said standard structure extracting unit, and
   a merge screen forming unit for forming a display screen to be supplied to the display after unifying the identical data and eliminating the redundant data, according to the detected results by said redundant data detecting unit.

* * * * *